Patented Dec. 21, 1948

2,457,055

UNITED STATES PATENT OFFICE 2,457,055

PRODUCTION OF STAINLESS STEEL

Donald L. Loveless, Baltimore, Md., assignor, by mesne assignments, to Armco Steel Corporation, a corporation of Ohio No Drawing. Application May 21, 1945, Serial No. 595,063

5 Claims. (Cl. 75—12)

My application is a continuation-in-part of my copending application Serial No. 432,492 filed February 26, 1942 now abandoned and entitled Production of stainless steel and the invention relates to the production of stainless steel and more especially to a method of low sulphur content.

Among the objects of my invention, is the provision of a safe, practical and efficient method of producing stainless steel, which includes the use of high-sulphur raw material; which in a simple, direct and economical manner nevertheless gives a clean, finished product substantially free of sulphur; which avoids the introduction of harmful ingredients into the metal during the elimination of sulphur; which is highly effective and quite simple to perform; and which in performance requires the use of cheap and readily available materials.

Other objects in part will be obvious and in part pointed out hereinafter.

The invention accordingly, consists in the combination of materials and composition of ingredients, and in the several steps and the relation of each of the same to one or more of the others as described herein, the scope of the application of which is indicated in the following claims.

As conducive to a clearer understanding of certain features of my invention, it should be noted at this point that stainless steel is defined as a low-carbon steel comprising 10% to 35% chromium, with or without nickel, and with or without supplemental additions of manganese, silicon, cobalt, copper, molybdenum, tungsten, vanadium, columbium, titanium, sulphur, and the like, for special purposes, and the balance substantially all iron.

In accordance with certain practices, it is customary to prepare a melt of plain low-carbon steel of high purity, and to incorporate chromium in the melt by way of expensive refined ferro-alloys, such as low-carbon ferrochrome. Recently developed processes of producing stainless steel, however, involve the use of cheap raw materials as a source of chromium, and are directed toward the achievement of a lower ingot cost. These processes broadly include melting in proper proportions, a cheap chromium-bearing ingredient and a source of iron in a suitable metallurgical furnace, to produce an iron-chromium bath. The bath is subjected to refining treatment whereby carbon is removed and a finished steel is produced.

In the more recent processes, the raw materials serving as a source of chromium include stainless steel scrap, which becomes available in large quantity about the melt shop, the rolling mill, and the various customer plants, in the form of pit and skull scrap, crop-ends, cuttings, and the like. Likewise, in certain more recent processes, the source of chromium includes chrome ore and/or high-carbon ferrochrome, the proportions of these ingredients and stainless steel scrap being adjusted to achieve satisfactory furnace operating conditions, and also to recognize variations in the availability of these materials and the fluctuation in their market prices.

Particularly in the more recent stainless steel processes, a problem of eliminating excess sulphur has arisen. This comes about through the widespread use of the "free-machining" grades of stainless steel. These steels purposely have a high sulphur content to give the "free-machining" characteristic. The scrap from these high sulphur steels, for example, in the form of scrap metal, roll scale, grinding dust, and the like, provide large quantities of iron and chromium. They possess limited value in stainless steel production because of their high sulphur contents. Unfortunately, however, it is impossible or commercially impractical to exclude these from the scrap yard, particularly since a number of different grades of steel are made and rolled at a plant and there is no feasible way of separating the scrap. Where such raw materials are employed, large quantities of sulphur go into the finished steel as an incidental ingredient, and this in many instances proves to be a serious matter.

Although sulphur serves a beneficial function in certain grades of stainless steel, as in the "free-machining" grades, control over sulphur is important where an excess is to be avoided or where steel of certain quality is desired, as in other grades. Stainless steel containing abnormally high percentages of sulphur is characterized, for example, by hot-shortness and thus the metal is inclined to tear in hot-working. The sulphur promotes fibrous structure which causes splitting in hot-working and in cold-forming, as in cold-heading upsetting and the like. Moreover, excess sulphur reduces the normal ductility of stainless steel, and corrosion resistance of the steel in certain media is adversely affected.

I find that the elimination of sulphur from a melt of stainless steel involves considerations entirely different from those encountered in the removal of sulphur from plain carbon steel. In way of illustration, the conventional carbide slag process employed in removing sulphur from molten carbon steel, cannot be applied successfully low-carbon to molten stainless steel. Chromium possesses a great thirst for carbon, and the carbon available in the carbide slag therefore, goes into solution with chromium of molten stainless steel. It must be noted in this connection that carbon, as well as other impurities picked up by the refined molten metal, as for example, after a metal deoxidizing operation, is a serious matter for the properties of the metal are adversely affected.

Moreover any elimination of incidental quantities of sulphur in prior processes of stainless steel wherein the conventional lime-fluorspar slag is employed is not applicable to the elimination of substantial quantities of sulphur in the presence of chromium. I find that the slag is objectionably heavy. Moreover that it quickly loses its fluidity apparently due, at least in part, to a decomposing of fluorspar, this giving a higher lime content which then must be compensated with a further addition of fluorspar. Furthermore, I find that in high temperature furnace operations the odor of fluorine is objectionably noticeable about the melt-shop. This is particularly objectionable to the crane operators. It is unsafe to men and equipment.

An object of my invention, therefore, is the production of stainless steel of low sulphur content in a simple, direct and economical manner, using raw materials which contain substantial amounts of sulphur, which method of production avoids introducing into the metal undesirable contaminating materials such as carbon, and which in addition to effecting highly satisfactory removal of sulphur, achieves sound, clean metal, free of undesirable metal oxides.

Referring now more particularly to the preferred practice of my invention, I employ an electric arc furnace of the well known Heroult type, lined to a height somewhat above the slag line with chromite brick, and having side-walls and roof of silica brick. Either carbon or graphite electrodes may be employed, the applied voltage being preferably available in several steps within the range of 100 to 275 volts. In preparing the furnace for reception of a charge, I apply a protective coating of burnt lime over the chromite brick lining. The proportion of lime used approximates 10 pounds per ton of steel to be produced in the furnace, and serves to retard erosion of the lining by molten metal and slag.

In the production of a heat of stainless steel, I charge into the furnace as a source of chromium, one or more of the group consisting of chrome ore, high-carbon ferrochrome, and stainless steel scrap. This latter, such as imperfect ingots, ingot butts, crop ends, roll scale, pit and skull scrap, grinding dust, and the like, may contain considerable amounts of the sulphur-bearing or free-machining grades of stainless steel. An amount of available oxide of iron, such as plain low-carbon steel roll scale, sufficient to remove and/or exclude carbon entering into the process and an amount of ordinary base iron or steel scrap, also are conveniently charged with the chromium-bearing ingredients. In any one or more of the charged materials, including the plain low-carbon steel, roll scale and base iron or steel scrap, sulphur usually is present in amount sufficient to introduce an excess of sulphur into the process.

Alternating current electrical energy is supplied the furnace and the charge of ingredients begins to melt down. There is formed a ferrous metal bath containing chromium. Overlying this bath, there is formed a blanket of slag which is strongly oxidizing in character, by virtue of the large quantities of iron oxide, and chromium oxide in the charge.

The strongly oxidizing slag blanket is instrumental in oxidizing the carbon supplied the molten metal by the furnace charge. Carbon in the furnace atmosphere and furnace electrodes, generally is excluded from the melt by the slag blanket. Any such carbon picked up by the bath, however, is oxidized along with that coming from the charge. The oxidation of carbon from the metal is greatly accelerated and rendered effective in achieving a commercial practical process by conducting the melting operation at a high melt-down temperature.

No reliable method is known to me for determining accurately the temperature of the metal bath under the slag blanket, but it is estimated that this temperature should be approximately 3050° F. to 3200° F., which is some 100 to 250° F. higher than is usually employed in processing carbon steels. The high temperature which I employ renders the iron oxide slag more active in combining with carbon, and thus renders more effective the removal and exclusion of carbon from the melt. After melting down, additional mill scale may be added to the slag, as circumstances require. Samples are taken of the metal and when the carbon content is found to be sufficiently low, usually 0.1% or less, the oxidation period is ended.

I then carry out a second or reducing step, wherein recovery is had of the reducible oxide content of the slag. I perform the reducing step by adding to the bath a non-carbonaceous reducing agent, such as crushed ferrosilicon, alsifer (aluminum-silicon-iron alloy), or crushed ferrochrome-silicon, in amount chemically in excess of the oxides of iron and chromium present in the slag. Chromium oxides and iron oxides in the slag are reduced by the non-carbonaceous reducing agent and the chromium and iron gravitate into the melt. Silicon contamination of the melt is prevented during this step by adding burnt lime to the melt in amount ranging from 3 to 5 times that of silicon in the non-carbonaceous reducing agent. Conveniently, the burnt lime and non-carbonaceous reducing agent are mixed together in proper proportions, on the floor of the melt shop, and are added to the slag as furnace conditions require. The reducing period is brought to an end when the slag loses its black color and takes on a light gray appearance. This coloration of slag samples indicates that the iron oxide and chromium oxide contents have fallen to a relatively low value.

Following the reduction period, I withdraw the slag overlying the metal bath. In order to ascertain the amount of sulphur picked up by the molten metal from the materials of the furnace charge, I promptly take samples of the metal and run a sulphur test on the samples. Ordinarily, these tests show an excessive sulphur content, for example, .03% to .10%, while the specifications require under .030% and usually under 0.015%, as large rejections have been experienced, when sulphur is over .015 on many types of stainless steel.

I then build up a sulphur reactive slag on the surface of the high-sulphur metal bath. The slag which I preferably employ contains large amounts of burnt lime ranging in amount, depending upon sulphur content of the metal and ilmenite, rutile, titanite, or other titanium-oxide bearing ingredient, in amount sufficient to render the slag thin, fluid and creamy in appearance. The titanium-oxide does not decompose but directly serves to fluidify the slag. Because of this permanence there is no loss of fluidity as the reaction progresses.

In my sulphur-reactive slag I employ about 55 to 75 pounds of burnt lime per ton of metal, and preferably around 65 pounds per ton. These ranges are in general critical because I find that with a lesser amount of lime, sulphur is not eliminated and with a higher amount the slag tends to stiffen and become thick and difficult to manage thus precluding sulphur elimination. The ilmenite, rutile or titanite usually is employed in the amount of about 10 to 30 pounds per ton of metal, about 20 pounds per ton of metal being an average addition. This addition is not quite so critical as that of the lime. The amount of ilmenite, or other titanium-oxide bearing ingredient added need be sufficient only to establish proper slag conditions as noted and this generally is had with some 10 to 30 pounds of ilmenite per ton of metal, the ilmenite generally amounting to between $\frac{1}{5}$ and $\frac{1}{2}$ of the lime employed.

In the practice of my process, I find it advantageous to build up the slag in stages, as for example, by adding to the metal about one-half the lime and titanium-oxide bearing ingredient immediately after the sulphur test. When the first added slag ingredients are rendered fluid under the intense heat of the molten metal, I add the balance of the lime and titanium-oxide-containing ingredient, in proper proportion as a mixture, reserving separate amounts of each ingredient for separate addition to the melt where conditions require.

Once the sulphur-reactive slag blanket is provided on the molten metal, which usually requires about one-half hour, it is held on the metal for a period of about three-quarters of an hour. During this latter period, the slag and the metal are rabbled from time to time, as for example, at five-minute intervals. The rabbling serves to maintain the slag in fluid condition, and also brings the slag into more intimate contact with the molten metal.

Apparently, in my process, sulphur in the metal reacts with the very large amounts of lime present in the thin, fluid slag. It is believed that calcium sulphide accordingly forms a slag ingredient. Check tests are made throughout the finishing period, in order to ascertain the sulphur content of the metal, as well as other ingredients. A great loss of sulphur is observed.

Where the tests indicate metal of proper analysis, I then tap the furnace into a ladle for teeming. From the ladle, the melt is teemed into ingot molds, where it is permitted to solidify and cool. After cooling, the ingots are stripped from the molds and are ready for storage and subsequent reheating and conversion.

Where desired, during the finishing period, supplementary additions of chromium, nickel, copper, tungsten, vanadium, aluminum, titanium, zirconium, and the like, are made, as desired, either in the furnace or in the ladle in order to bring the steel to final analysis. The additions usually are made by the use of refined ferro-alloys or by employing electrolytically-derived metal.

My process, accordingly, advances the art of stainless steel production to a point where high sulphur ingredients are sucessfully used as a source of chromium and/or iron, in making low-sulphur stainless steel. As noted above, my process enables the consumption of high-sulphur stainless steel waste, including pit and skull scrap imperfect ingots, ingot butts, crop ends, roll scale, grinding dust, and the like, which heretofore had limited reclamation value. Since large amounts of mixed waste including high sulphur steel becomes available in the melt shop, and in the various consumer plants where rustless steel sheet, strip, bars, rods, wire and the like are fabricated, my process has considerable value from the standpoint of economy. It will, of course, be understood that certain ore, plain carbon steel waste, and the like, also serve as a source of objectionable sulphur in the production of stainless steel, and that my process is employed to advantage in consuming such materials.

The desulphurizing step of my invention is simple to perform and in performance requires only cheap and readily available materials. With the step, a considerable loss of sulphur is successfully achieved in a short period of time. I find, for example, that steel which after oxidation and reduction treatement, contains 0.025% to 0.030% sulphur, is refined to a sulphur content of 0.002% to 0.010% in about one hour and fifteen minutes. This period is that from the slag-off step following reduction, to the time of tapping.

In the practice of my invention, I find that the desulphurizing slag also acts as a protective blanket for the molten metal. The rabbling, and the ilmenite, rutile, titanite slag ingredient ensure that a fluid slag consistently is maintained throughout the period of metal treatment. The metal bath, therefore, is not exposed appreciably to the atmosphere and readily oxidizable alloy constituents, such as chromium, in the metal, are little affected.

The consistently fluid condition of the finishing slag, as well as the rabbling operation, ensure most intimate contact between slag ingredients and the molten metal. There is no loss of fluidity through decomposition and the desired proportions of lime and titanium-oxide bearing ingredients readily maintained throughout the operation. Sulphur in the metal thus is thoroughly eliminated by reaction with the large quantities of burnt lime in the slag. The slag, moreover, is of non-carbonaceous character and the melt, therefore, is not contaminated with extraneous carbon.

Thus it will be seen that there has been provided in my invention, an art of producing low-sulphur stainless steel, in which the various objects hereinbefore noted, together with many thoroughly practical advantages are successfully achieved. It will be seen, further, that the process lends itself to the rapid, efficient, economical and reliable manufacture of low-sulphur stainless steel of high purity employing a maximum of available and inexpensive sulphur-containing raw materials. The process is particularly favorable to achieving economy, through consumption of a wide range of chromium-containing ingredients; especially scrap, roll scale, grinding dust, high-carbon ferrochrome and chrome ore, which are combined proportionately, with practical limits, in accordance with the variations in their availability, and in accordance with the fluctuations in their market values.

While as illustrative of the practice of my invention, one or more chromium-bearing ingredients such as stainless steel scrap, chrome ore, and high-carbon ferrochrome, one or more of which also may contain considerable quantities of sulphur, are charged into the furnace, together with an ingredient source of iron or steel, and an oxide of iron; it will be understood that any one or more of the materials may be added either wholly or in part before the end of the oxidation period, where practical, rather than as an ingredient in the initial furnace charge.

As many possible embodiments may be made of my invention and as many changes may be made in the embodiment hereinbefore set forth, it will be understood that all matter described herein, is to be interpreted as illustrative, and not in a limiting sense.

I claim:

1. In the production of stainless steel of low carbon and low sulphur contents, the art which includes, melting in an electric arc furnace having a chromite lining a charge including high-sulphur stainless steel scrap and high-carbon ferrochrome thereby forming a bath of high-sulphur metal; maintaining said bath under an oxidizing slag blanket at a high temperature to remove carbon from the bath, this action being accompanied by a loss of chromium into the slag; adding an excess of silicon-containing reducing agent to the slag whereby chromium contained in the slag is precipitated into the underlying bath; removing the residual slag from the surface of said bath; building up on the bath a sulphur-reactive lining finishing slag comprising substantial amounts of burnt lime and ilmenite; and then rabbling the slag and bath to effect removal of sulphur from the bath while minimizing contamination with chromite.

2. In the production of stainless steel of low carbon and low sulphur contents, the art which includes, melting in an electric arc furnace having a chromite lining a charge including high-sulphur stainless steel scrap and chrome ore thereby forming a bath of high-sulphur metal; maintaining said bath under an oxidizing slag blanket at a high temperature to remove carbon from the bath, this action being accompanied by a loss of chromium into the slag; adding an excess of silicon-containing reducing agent to the slag whereby chromium contained in the slag is precipitated into the underlying bath; removing the residual slag from the surface of said bath; building up on the bath a sulphur-reactive lining finishing slag comprising substantial quantities of burnt lime and a slag-fluidifying agent largely consisting of titanium-oxide; and then rabbling the slag and bath to effect removal of sulphur from the bath while minimizing contamination with chromite.

3. In desulphurizing in an electric arc furnace having a chromite lining a bath of stainless steel of low carbon content and containing an excess of sulphur, the art which includes, preparing on the clean surface of the bath as a finishing step a sulphur-reactive basic slag comprising approximately 55 to 75 pounds of burnt lime per ton of metal in said bath, and substantial amounts of a titanium-oxide containing ingredient, and rabbling said slag and bath thereby eliminating the sulphur in the presence of chromium without carbon contamination and without oxidation and chromite contamination of the bath.

4. In the production of stainless steel of low carbon and low sulphur contents, the art which includes, melting in an electric arc furnace having a chromite lining a charge comprising stainless steel scrap, high-carbon ferrochrome and chrome ore, in which charge sulphur is present in substantial amount, thereby giving a substantially high sulphur metal bath with a slag containing the oxides of iron and chromium; reducing the oxides of iron and chromium of the slag with an excess of silicon-containing reducing agent to effect a recovery of its iron and chromium values; removing the residual slag; and then desulphurizing the bath, while minimizing chromite contamination, by means of a fluid basic finishing slag comprising substantial amounts of burnt lime and a titanium-oxide containing ingredient charged onto the bath in batches to give and maintain a slag of creamy consistency.

5. In the production of stainless steel of low carbon and low sulphur contents, the art which includes, melting in an electric arc furnace having a chromite brick lining a charge including stainless steel scrap and an oxidizing slag-forming material, in which charge sulphur is present in substantial amount, to form a slag covered bath of ferrous metal containing chromium and an excess of carbon and sulphur; maintaining said bath beneath the slag at high temperature until the carbon content of the bath is lowered to desired value, said step being accompanied by a loss of chromium into the slag; reducing the oxides of iron and chromium of said slag with an excess of silicon-containing reducing agent, thereby achieving a recovery of chromium lost from said bath; withdrawing the remaining slag from said bath to give a clean bath surface; and immediately desulphurizing the bath, while minimizing contamination of the metal with chromite, by means of a finishing slag containing at least 55 pounds of burnt lime and at least 10 pounds of ilmenite per ton of metal bath.

DONALD L. LOVELESS.

REFERENCES CITED

The following references are of record in the file of this patent:

UNITED STATES PATENTS

| Number | Name | Date |
|---|---|---|
| 768,265 | Carlsson | Aug. 23, 1904 |
| 1,458,568 | Bennett | June 12, 1923 |
| 1,662,977 | Shackelford et al. | Mar. 29, 1927 |
| 1,954,400 | Arness | Apr. 19, 1934 |
| 2,049,091 | Stimson | July 28, 1936 |
| 2,110,066 | Heuer | Mar. 1, 1938 |

OTHER REFERENCES

Refining Metals Electrically, pages 123 to 126, by Barton; published in 1926 by the Penton Publishing Co., Cleveland, Ohio.